Aug. 20, 1957     D. A. EDGECOMBE ET AL     2,803,215
APPARATUS FOR LUBRICATING EXTERNAL SURFACE OF EXTRUSION BILLET
Filed Aug. 24, 1954     2 Sheets-Sheet 1
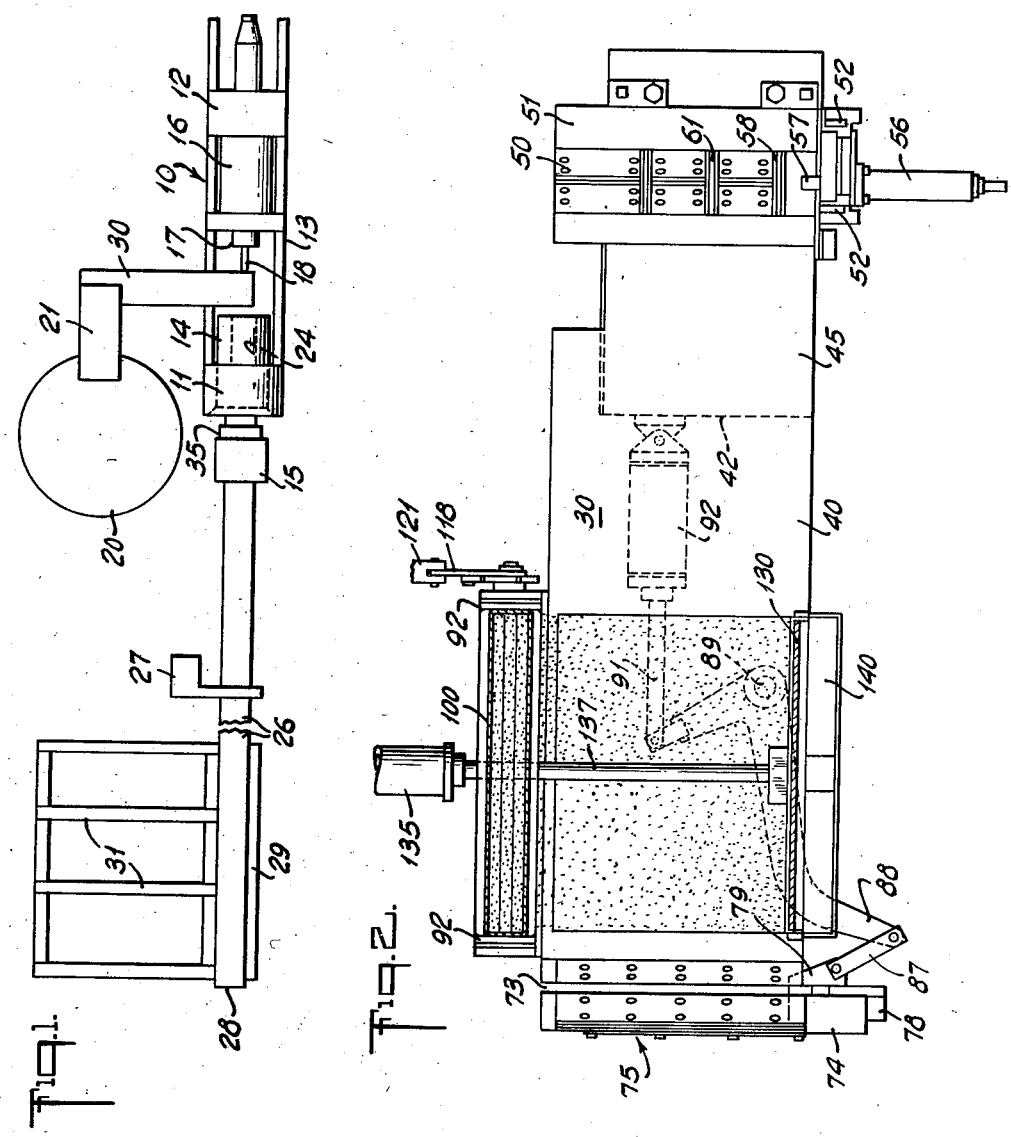
INVENTORS
DAVID A. EDGECOMBE
SIDLEY O. EVANS
BY
ATTORNEY

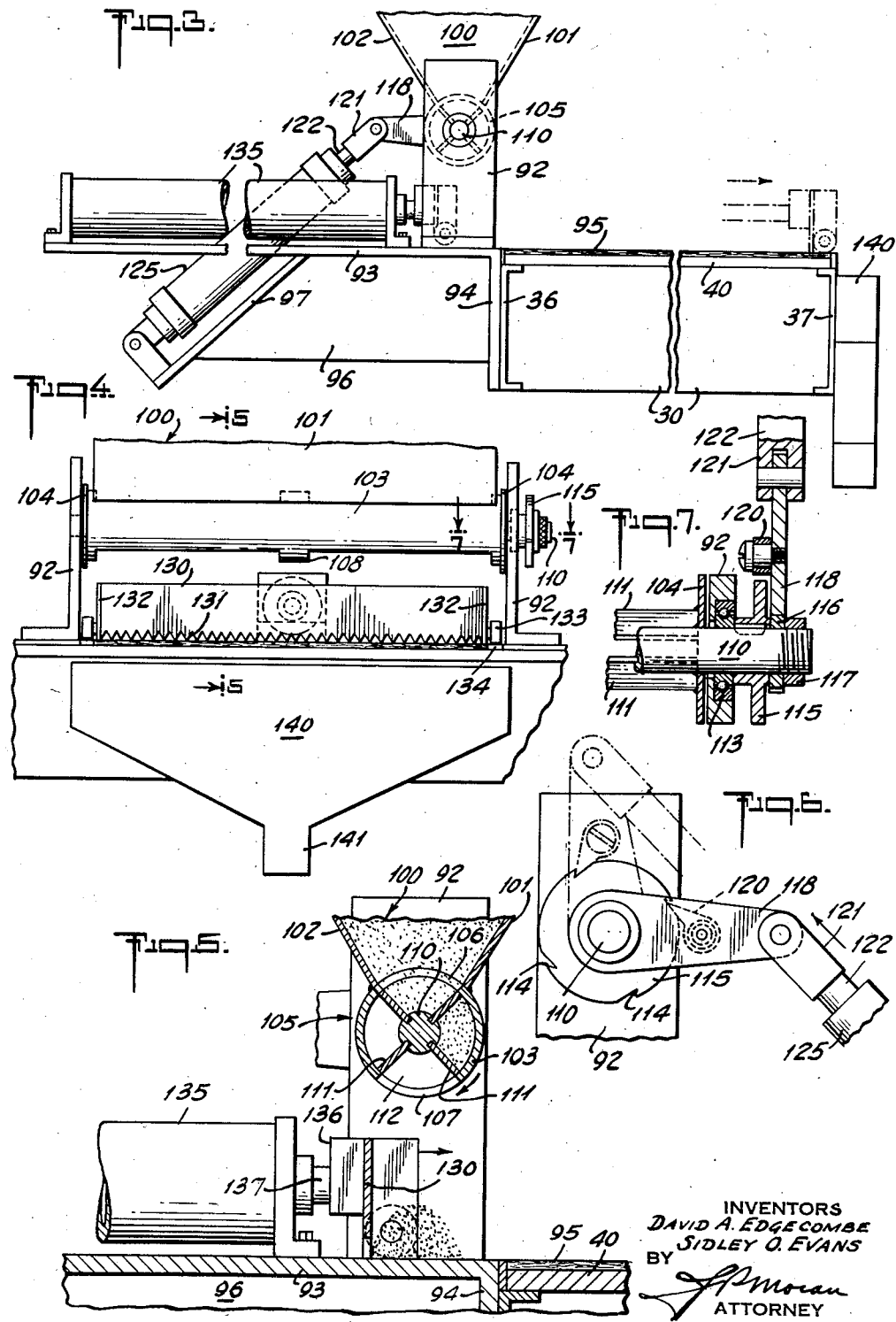

United States Patent Office 2,803,215
Patented Aug. 20, 1957

2,803,215

APPARATUS FOR LUBRICATING EXTERNAL SURFACE OF EXTRUSION BILLET

David A. Edgecombe and Sidley O. Evans, Beaver Falls, Pa., assignors to The Babcock & Wilcox Company, New York, N. Y., a corporation of New Jersey Application August 24, 1954, Serial No. 451,892

8 Claims. (Cl. 118—233)

This invention relates to apparatus for applying a pulverized refractory lubricant to the outer surface of an extrusion billet and, more particularly, to apparatus for cyclically distributing a uniform layer of such lubricant to cover a surface over which a heated, cylindrical billet rolls on its way to an extrusion press.

In the formation of metal shapes by extrusion, a block or billet of metal at an elevated temperature is forced under high pressure to flow through a die having an opening corresponding to the desired cross-sectional shape of the extrusion to be produced. The temperature of the metal may be 2300 F., in the case of steel, by way of example.

To form a tubular extrusion, the billet is usually pierced before insertion in the extrusion press and, before ram pressure is applied to the billet, a mandrel is projected coaxially through the billet and die. When pressure is applied to the billet, the billet metal flows through the die around the mandrel, so that a tube is extruded having dimensions determined by the die and the mandrel. In effect, the die and mandrel cooperate to form an annular die.

In a typical extrusion press, a front and rear platen are held in accurately spaced relation with each other. Between the platens is mounted a billet container for movement toward and away from the forward platen. The rear platen supports a ram arranged to project into the container and force a billet therein to flow through the die. The latter is mounted in a die holder releasably engaged in a die carrier aligned with the container passage. This carrier is mounted for movement into and out of the forward platen to move the die into and out of operative relation with the exit or downstream end of the container. A mandrel is coaxially telescoped in the ram for projection through a pierced billet and into the die for tubular extrusions.

When an extrusion is to be made, the container is moved forwardly to seat against the rear face of the forward platen. A die holder and die assembly is meanwhile mounted on the rear face of the carrier and the latter is moved rearwardly into the forward platen to engage the die in a recess in the forward end of the container and coaxial with the container passage. The carrier is then locked to the forward platen. After a heated billet has been loaded into the container, the mandrel is projected through the billet and into the die. The ram, carrying a dummy block on its outer end, is then moved forwardly under very high pressure to force the billet outwardly through the die over the mandrel. The extrusion is then severed and conveyed away from the press.

The formation of metal shape by extrusion has been successfully applied to non-ferrous metals for some time. However, it is only recently that plain and alloy steels have been extruded using glass as a lubricant. This has been due to the relative difficulties and problems involved in the extrusion of steels an daloys as compared to the difficulties and problems of extruding non-ferrous metals such as aluminum, brass and copper. For example, the use of lubricants having a carbon base for the extrusion of some alloy steels may require an excessive amount of refinishing of the extruded shape due to the carbon pickup in the hot metal. These extra finishing operations have prevented the extrusion process from attaining a competitive position with respect to other metal working processes.

This picture has been changed radically by the introduction of a new steel extrusion process in which relatively refractory materials, such as glass, have been used as lubricants. These refractory materials have the advantage that they do not contain any significant amounts of carbon as a constituent element, coupled with a further advantage that the glass has the property of melting in successive layers or films as it is contacted by the hot metal. Thus, only the surface or contacting layer of the glass is initially melted as the billet moves therealong, and as this film is destroyed, successive underlying layers or films are melted sequentially, thus providing a continuous lubricant film between the extrusion and the die through which the extrusion is being forced under very high pressures.

In the aforementioned typical extrusion press, plugs of glass fiber or similar materials are placed in the container passage before the billet is loaded into the container. Charging of the billet into the container pushes these plugs up against the upstream or entry suface of the die. In addition, a layer of glass lubricant is applied to the external surface of the hot billet as the latter is being fed to the extrusion press. This may be effected by wrapping a sheet of glass fiber around the billet surface as the heated billet rolls over a transfer surface toward the press, or by rolling the hot billet over a bed of powdered glass.

The glass lubricant may be applied to the surface of the billet passage by depositing a measured quantity of particulate glass in the passage before the billet rolls over the transfer surface. As the billet rolls along toward the press, this glass is distributed over and adheres to the hot metal of the surface of the passage, forming a uniform depth layer of glass thereon. This method of lubricating the billet passage, and the apparatus for effecting it, form the subject matter of the copending application of A. B. Capron et al., Serial No. 413,766, filed March 3, 1954.

For effective lubrication, the layer of lubricant applied to the external surface of the heated billet must be substantially uniform in depth and uniformly distributed over the billet surface. The nature of the surface over which the billet rolls is important, as this surface should have the ability to deflect somewhat as the billet rolls thereover, to make the particulate glass to conform to the billet surface. Also, the billet supporting surface should be of a nature such as not to absorb heat, in order to promote adherence of the glass to the billet and softening of the glass by the heat of the billet. As described in the copending application of Sidley O. Evans and William R. Walker, Serial No. 423,312, filed April 12, 1954, such a surface is provided by a sheet or blanket of asbestos or other similar heat resistant material.

To provide uniform depth to the layer of glass adhering to the billet, the glass should be distributed to a uniform depth across the path of travel of the billet. The present invention is directed to novel apparatus for effecting such uniform distribution.

The apparatus of the invention comprises a hopper arranged to contain a supply of particulate refractory lubricant, a spreader arranged to spread a charge from the hopper across the path of travel of the billet, and a receptacle to receive excess material from the spreader. The hopper and spreader are operated in coordination to discharge material in front of the spreader, move the spreader across the transfer surface, and retract the spreader, and preferably these motions are cyclically synchronized with the transfer of a lubricant coated billet to the extrusion press.

The hopper is mounted adjacent and along one longitudinal edge of the transfer surface and provided with a compartmented rotary discharge valve. A step mechanism moves one, filled, compartment of this valve to the discharge position and another, emptied, compartment to the filling position during each cycle of operation.

The glass is discharged as an elongated pile in front of the spreader which comprises an upright plate having forwardly projecting wings and a serrated lower edge. This plate is parallel to the edge of the transfer surface and is reciprocated thereover to spread the glass over the surface to a uniform depth determined by the serrated lower edge of the spreader. Excess material is pushed off the surface into the receptacle and re-used. Preferably, the glass is distributed over a blanket or sheet of asbestos covering the transfer surface.

For an understanding of the invention principles, reference is made to the following description of a typical embodiment thereof as illustrated in the accompanying drawings.

In the drawings:

Fig. 1 is a schematic plan view of an extrusion press and associated billet and extrusion handling and processing components;

Fig. 2 is a plan view of billet transfer means incorporating the invention apparatus;

Fig. 3 is a side elevation view of the invention apparatus, the transfer means being in section;

Fig. 4 is a front elevation view of the invention apparatus, looking from the right of Fig. 2;

Fig. 5 is a vertical sectional view on the line 5—5 of Fig. 4;

Fig. 6 is a detail elevation view of the hopper discharge mechanism; and

Fig. 7 is a horizontal sectional view on the line 7—7 of Fig. 4.

Referring to Fig. 1, an extrusion press 10 is illustrated as including a front platen 11, a rear platen 12 rigidly tied to platen 11 by tie rods such as 13, a container 14 having limited longitudinal movement relative to the platens, a die carrier 15 movable into and out of front platen 11, and a ram assembly 16 having a ram 17 projectable into container 14. A mandrel 18 is mounted coaxially of ram 17.

As described in the copending application of Sidley O. Evans, Serial No. 328,688, filed December 30, 1952, now Patent No. 2,739,799, issued March 27, 1956, billets intended for the extrusion of tubular products are preferably initially heated to a piercing temperature and then pierced with an I. D. somewhat larger than that of the extruded tubular products. The initial heating means, the piercing press, and associated conveyors, and handling devices have not been shown as they form no part of the present invention.

The pierced billets are then heated to a high temperature, such as 2300 F. in the case of steel, in a preferably rotary heating means 20. The billets are charged into heating means 20 and extracted therefrom by suitable billet handing device 21. This device deposits the heated billets onto a transfer means 30 which transfers the billets into alignment with passage 24 of container 14 and ejects them into this passage.

Mandrel 18 is first extended through the billet passage and through a die 35 mounted on the rear face of carrier 15 and held thereby against the exit end of container passage 24, carrier 15 being locked into forward platen 11 and thus held against movement relative to the two platens 11 and 12. Ram 17 is then projected into passage 24 to engage the billet and force it, under high pressure, to flow through die 35 around mandrel 18, thus forming a tubular extrusion. Mandrel 18 is withdrawn into ram 17 at the end of the extrusion stroke, and ram 17 and mandrel 18 are then conjointly withdrawn and container 14 moved rearwardly a short distance away from front platen 11. The extrusion is then severed between the container and front platen, after which container 14 is moved forwardly and the extrusion withdrawn by runout table and conveyor 26. Ram 17 is then moved into container 14 to eject the severed end, or discard, of the extrusion, this discard moving into platen 11 and falling into a suitable receptacle.

Meanwhile, conveyor 26 moves the extrusion forwardly beneath a saw 27. The latter severs the extrusion into the required handling lengths and the cut sections are moved forwardly against a stop 28. At this point, a pusher 29 moves the sections laterally from conveyor 26 onto skids 31 for storage or further handling.

Before the billet is charged into the passage 24 of container 14, one or more cylindrical plugs of glass fiber are placed in the passage 24 so that loading of the billet thereinto will result in the plugs being interposed between the billet and the upstream face of the die assembly. The die assembly is shown and described more particularly in the copending application of David A. Edgecombe, Serial No. 334,211, filed January 30, 1953, for "Die Charging Arrangement for Metal Working Apparatus," now Patent No. 2,731,123, issued Jan. 17, 1956.

Referring to Figs. 2 and 3, the transfer means or surface 30 is provided, adjacent its end remote from the extrusion press, with a sloping surface or ramp 45 leading into a substantially level platform 40. The billet is deliverd from heating means 20, by a billet handling device 21 which may be the type shown ind described in above indicated Patent No. 2,739,799. As described more particularly in such Evans application, device 21 is a drum-shaped elevator carrying on its periphery a trough arranged to receive a metal "basket" in which is a highly heated billet.

In the unloading position of means 21, this trough is aligned with a trough 50 formed in the upper surface of a table 51 pivotal on trunnions 52 on a shaft extending longitudinally of surface 30. Trough 50 may thus be swung up into alignment with the trough on means 21 to receive a billet, and then lowered to hold the billet axis parallel with transfer surface 30.

Extending from the hinged end of platform 51 is a shock absorber means 56 having a plunger 57 extending into trough 50 in substantial central alignment therewith. As the billet is ejected into trough 50, the plunger 51 acts as a cushioning means for the billet. By reference to Fig. 2, it will be noted that trough 50 is formed with transverse slots 58. As the trough reaches its horizontal position, rockable fingers 61 enter the slots to be slightly beneath the upper surface of the trough.

As described in said copending application, Serial No. 413,766, solid glass, in the form of powered glass, is deposited along the axial passage of the heated billet while the latter is in trough 50. The amount of solid glass so applied is selected in accordance with the billet temperature, composition, length, and I. D. to provide a lubricant film, on the surface of the axial passage, having the required depth for effective lubrication of mandrel 18 and the billet passage. Fingers 61 are then rocked upwardly to eject the billet from trough 50 to roll down surface 45 and over surface 40. The solid glass in direct contact with the hot metal is melted by contact therewith and sticks to the surface of the passage. As the billet rolls over transfer means 30, the pile of glass is tumbled so that additional glass is brought into direct contact with other portions of the hot metal of the billet passage to melt and stick thereto. In this manner, the powdered glass is uniformly distributed over the surface of the billet passage to form a uniform depth glass layer.

As described more fully hereinafter, novel apparatus is provided to distribute a uniform depth of particulate glass over the path of the billet to form a layer of glass lubricant on the external surface of the billet as the latter rolls over surface 30. Preferably, this layer of particulate glass is spread uniformly over a blanket or sheet 95 of yieldable heat-resistant material, such as asbestos or similar material, which is placed on surface 40. Particulate glass is spread over sheet 95 before billet 100 rolls over surface 30.

As the billet rolls over the particulate glass on sheet 95, the sheet yields under the weight of the billet bringing the glass into conforming engagement with the external surface of the billet. The glass sticks to the hot surface of the billet, whenever the latter comes in contact with the glass, and softens to flow over the surface to form a uniform depth glass layer thereon. The softening and flowing of the glass is facilitated by the action of heat-resistant cushion or sheet 95 which maintains the heat in the billet rather than extracting heat therefrom. The heat thus retained in the billet by the insulating effect of blanket or sheet 95 has the incidental result that the billet, when charged into the press, is somewhat hotter than it would be otherwise.

At the end of surface 40 nearest the extrusion press, the billet rolls into the container charge device or billet ejector 75. Referring again to Fig. 2, this ejector comprises a V-shaped trough having a slot 73 along its apex. The outer wall of trough 75 carries a guide 74 having a key-shaped slot receiving a correspondingly shaped rib formed on an ejector bar 78. Ejector bar 78 is thus guided to move along slot 73.

In its opposite surface, bar 78 has projecting therefrom an ear 79 connected by a link 87 to one end of a crank 88 pivoted on an axis 89 to swing parallel to surface 40. The other end of crank 88 is connected to the piston 91 of a pressure fluid actuator 90 pivoted to a cross brace 42 of the transfer means framework. Actuator 90 is operated, when trough 73 is aligned with container passage 24, to swing crank 88 to move bar 78 along slot 73 in trough 75 to charge the billet into the container passage.

While trough 75 is shown fixed to surface 40 for illustrative purposes, in actual practice it may be mounted on the free end of a pivoted section of transfer means 30 so as to be swingably out of the path of movement of the extrusion press parts. The details of any such construction form no part of the present invention. Also, the trough 50 may be made movable longitudinally relative to transfer means 30 between the illustrated position and a receiving and tilted position adjacent means 21.

The means for spreading the particulate glass over blanket 95 comprises a V-shaped trough or hopper 100 mounted on angle brackets 92 secured to a horizontal leg or platform 93 having a vertical leg 94 secured on a longitudinal side element 36 of transfer means 30. A vertical brace 96 extends along the undersurface of platform 93 and has a bevelled outer edge to which is secured a sloping support plate 97.

The front and rear walls 101, 102 of hopper 100 converge in a downward direction to form a discharge opening controlled by a rotary, compartmented valve generally indicated at 105. Valve 105 comprises a cylindrical casing 103, welded or otherwise secured to walls 101, 102, and inclosed at each end by plates 104 secured to a shaft 110. The valve casing thus serves to secure and position hopper 100 on brackets 92. Casing 103 has diametrically opposite upper and lower openings 106 and 107, these openings having an arcuate extent of substantially 90°. The openings 106, 107 extend throughout substantially the entire length of hopper 100, being interrupted substantially midway of their lengths by a continuous portion 108 of casing 103 which serves as a support for a ring (not shown) mounted midway of shaft 110.

The latter extends axially of casing 103 and through closures 104 and brackets 92, and is longitudinally slotted, at four positions 90° apart, to receive vanes 111 defining valve compartments 112. The right end of shaft 110 (as viewed in Figs. 4 and 7) extends through a bearing 113 in a bracket 92 and a four-toothed ratchet wheel 115, with its teeth 114 spaced 90° apart, is keyed to shaft 110 beyond bracket 92. Adjacent the outer side of wheel 115 is a bronze bushing 116 held in position by a nut 117 threaded on shaft 110. Bushing 116 is set in a crank arm 118 which is thus oscillatable on shaft 110. Crank 118 pivotally supports a pawl 120 engageable with the teeth 114 of ratchet 115.

The outer end of crank arm 118 is pivotally secured in a forked bracket 121 on the outer end of a piston rod 122 of a fluid pressure actuator 125 mounted on plate 97. The stroke of actuator 125 is so selected that, each time rod 122 is projected, crank 118, through engagement of pawl 120 with teeth 114, rotates ratchet 115 clockwise through 90° (as viewed in Fig. 5). This brings an empty compartment 112 into alignment with upper opening 106 of valve casing 103 to receive a charge of particulate glass from hopper 100. At the same time, a filled compartment 112 is aligned with lower opening 107 of casing 103 to discharge a measured quantity of particulate glass onto platform surface 93 in front of an upright spreader or "comb" 130 extending parallel to a side edge of transfer surface 30.

Spreader 130 has a serrated lower edge 131 and forwardly directed side flanges 132, 132. Rollers 133 on each side flange ride on rails 134 defining the leading and trailing ends of a shallow recess in surface 30 receiving blanket or mat 95. On the rear surface of comb 130 is a block 136 secured to the piston rod 137 of a fluid pressure actuator 135 mounted on platform 93.

When rod 137 is extended, comb 130 pushes the pile of particulate glass—deposited in front of it by actuation of valve 105—across blanket 95. The serrated lower edge 131 of the comb provides a uniform depth of glass on the blanket.

At the far side of surface 30, the excess glass still remaining in front of comb 130 is pushed by the comb into a hopper shaped container 140 mounted on a side support member 37 of surface 30. Container 140 has sloping bottom walls converging to a discharge spout or neck 141 through which the glass falls into a suitable receptacle (not shown). This excess glass may be re-deposited into hopper 100.

Suitable conventional sequence timing means are provided to operate the glass spreading means in a pre-set sequence preferably synchronized with the operation of charging a billet into press 10 from trough 75. Immediately after such discharge, actuator 125 is operated to project piston rod 122 to rotate shaft 110 to align a filled compartment 112 with opening 107, actuator 125 then retracting rod 122. This deposits a heap of glass along platform 93 in front of comb 130. At this time, actuator 135 is operated to project its rod 137 and advance comb 130 across blanket 95 to spread a uniform depth layer of particulate glass thereover, excess glass being pushed into container 140. Actuator 135 immediately retracts rod 137 to withdraw comb 130. When a heated billet is ejected from trough 50 by fingers 61, it rolls over the glass layer to pick up the glass, which sticks to the hot outer surface of the billet, flowing thereover to form a uniformly thick layer of refractory lubricant thereon.

While a specific embodiment of the invention has been shown and described in detail to illustrate the application of the invention principles, it will be understood that the invention may be embodied otherwise without departing from such principles.

What is claimed is:

1. In hot metal working apparatus in which a heated metal billet is rolled over a transfer surface for charging into the apparatus, means for applying a layer of refractory material to the external surface of the billet, comprising, in combination, a container mounted at one side of said transfer surface to contain a quantity of the refractory material in particle form; spreader means movable across said surface from a material receiving position adjacent said container; metering means associated with said container to discharge a measured quantity of the refractory material into said spreader means; and means operable to reciprocate said spreader across said surface to and from such material receiving position to spread a layer of such refractory material across the path of travel of the billet for adherence to the billet surface, as it rolls over said transfer surface, to spread the refractory material into a layer thereof on the billet surface.

2. The combination as claimed in claim 1 in which said spreader means comprises an upright bar parallel to a longitudinal edge of the transfer surface and having a serrated lower edge.

3. The combination claimed in claim 1 in which said spreader means comprises an upright bar parallel to a longitudinal edge of the transfer surface, and having a serrated lower edge and upright side wings projecting forwardly from said bar transversely of the transfer surface.

4. In hot metal working apparatus in which a heated metal billet is rolled over a transfer surface for charging into the apparatus, means for applying a layer of refractory material to the external surface of the billet, comprising, in combination, a container mounted at one side of said transfer surface to contain a quantity of the refractory material in particle form and having a discharge opening elevated above said transfer surface; spreader means movable across said surface from a material receiving position behind the discharge opening of said container; metering means associated with said container discharge opening to discharge a measured quantity of the refractory material into said spreader means; and means operable to reciprocate said spreader across said surface to and from such material receiving position to spread a layer of such refractory material across the path of travel of the billet for adherence to the billet surface, as it rolls over said transfer surface, to spread the refractory material into a layer thereof on the billet surface.

5. The combination claimed in claim 1 in which said metering means comprises a rotary compartmented valve controlling said discharge opening and having, for each compartment, a position receiving material from said container and a position discharging material in advance of said spreader means.

6. The combination claimed in claim 5 including actuator means associated with said valve to step the latter to bring the compartments thereof successively to the receiving and discharge positions.

7. The combination claimed in claim 6 in which said valve includes a mouning shaft having a ratchet wheel thereon and said actuator means includes a reciprocable actuator and a pawl operated by said actuator and engaged with said ratchet wheel.

8. The combination claimed in claim 4 including a receiver adjacent the opposite side of said transfer surface to receive excess material from said spreader means.

References Cited in the file of this patent
UNITED STATES PATENTS

| | | |
|---|---|---|
| 1,433,561 | McRoberts | Oct. 31, 1922 |
| 1,771,495 | La Rue | July 29, 1930 |
| 1,786,437 | Lehman | Dec. 30, 1930 |
| 1,949,980 | Stanley | Mar. 6, 1934 |
| 2,390,195 | Tascher | Dec. 4, 1945 |